US012618420B2

(12) United States Patent
Zantz

(10) Patent No.: US 12,618,420 B2
(45) Date of Patent: May 5, 2026

(54) HYDRAULIC ACTUATOR AND METHOD FOR OPERATING

(71) Applicant: Airbus Operations GmbH, Hamburg (DE)

(72) Inventor: Tanno Zantz, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 0 days.

(21) Appl. No.: 18/761,984

(22) Filed: Jul. 2, 2024

(65) Prior Publication Data

US 2025/0027518 A1 Jan. 23, 2025

(30) Foreign Application Priority Data

Jul. 17, 2023 (EP) ...................................... 23185853

(51) Int. Cl.
*F15B 7/00* (2006.01)
*B64C 25/22* (2006.01)
(Continued)

(52) U.S. Cl.
CPC .............. *F15B 7/001* (2013.01); *B64C 25/22* (2013.01); *B64C 25/24* (2013.01); *F15B 1/265* (2013.01); *F15B 15/18* (2013.01); *F15B 15/26* (2013.01); *F15B 21/087* (2013.01); *F15B 7/10* (2013.01); *F15B 15/1428* (2013.01); *F15B 15/1447* (2013.01); *F15B 2211/27* (2013.01); *F15B 2211/6653* (2013.01); *F15B 2211/6654* (2013.01); *F15B 2211/6658* (2013.01);
(Continued)

(58) Field of Classification Search
CPC .. F15B 7/001; F15B 7/10; F15B 15/18; F15B 15/26; F15B 15/1428; F15B 15/1447;

F15B 1/265; F15B 1/149; F15B 2211/27; F15B 2211/6653; F15B 2211/6654; F15B 2211/6658; F15B 2211/7053; F15B 2211/7054; F15B 2211/7055; F15B 2211/715; F15B 2211/72; F15B 21/082; B64C 25/22; B64C 25/24; B64C 13/504
See application file for complete search history.

(56) References Cited

U.S. PATENT DOCUMENTS 6,042,345 A * 3/2000 Bishop .................. F04B 17/003
417/322
6,637,200 B2 * 10/2003 Barba ................... F04B 43/046
60/473

(Continued)

FOREIGN PATENT DOCUMENTS

DE 102005060436 A1 6/2007
EP 3324055 B1 7/2019

OTHER PUBLICATIONS

European Search Report for corresponding European Patent Application No. 23185853 dated Dec. 18, 2023.

*Primary Examiner* — Dustin T Nguyen
(74) *Attorney, Agent, or Firm* — Greer Burns & Crain Ltd.

(57) ABSTRACT

A hydraulic actuator comprising a housing, a piston, first to third pressure chambers, and a plurality of arrangements of piezoelectric elements arranged inside one of the plurality of chambers. A computer implemented internal brake for selectively switching between a braking mode and a non-braking mode of the piston comprises the third chamber, and fluid connections between the first to third chambers with flow control elements.

17 Claims, 5 Drawing Sheets

(51) Int. Cl.

| | | |
|---|---|---|
| *B64C 25/24* | (2006.01) | |
| *F15B 1/26* | (2006.01) | |
| *F15B 15/18* | (2006.01) | |
| *F15B 15/26* | (2006.01) | |
| *F15B 21/08* | (2006.01) | |
| *F15B 7/10* | (2006.01) | |
| *F15B 15/14* | (2006.01) | |

(52) U.S. Cl.

CPC ................. *F15B 2211/7053* (2013.01); *F15B 2211/7054* (2013.01)

(56) References Cited

U.S. PATENT DOCUMENTS

| | | | | |
|---|---|---|---|---|
| 7,267,043 B2 * | 9/2007 | Wright | .................... | F15B 15/18 |
| | | | | 60/473 |
| 7,484,940 B2 * | 2/2009 | O'Neill | ................. | F04B 43/043 |
| | | | | 417/413.1 |
| 7,849,685 B2 * | 12/2010 | Yamazaki | ............. | E02F 9/2214 |
| | | | | 60/403 |
| 10,690,154 B2 * | 6/2020 | Zöls | ....................... | F15B 11/022 |
| 11,193,510 B2 * | 12/2021 | Medaglia | .................. | F15B 9/09 |
| 11,286,961 B2 * | 3/2022 | Bachmaier | ................ | F15B 7/02 |
| 2016/0281747 A1 * | 9/2016 | Bachmaier | ............. | F15B 15/14 |
| 2019/0365819 A1 * | 12/2019 | Jones | ................. | A61K 38/1866 |
| 2019/0368519 A1 | 12/2019 | Zantz | | |

* cited by examiner

HYDRAULIC ACTUATOR AND METHOD FOR OPERATING

CROSS-REFERENCES TO RELATED APPLICATIONS

This application claims the benefit of European Patent Application Number 23185853.1 filed on Jul. 17, 2023, the entire disclosure of which is incorporated herein by way of reference.

FIELD OF THE INVENTION

The invention relates to a hydraulic actuator and an operation method for such a hydraulic operator.

BACKGROUND OF THE INVENTION

A hydraulic actuator is known from EP 3 324 055 B1 which discloses a hydraulic actuator with an integrated piezo stack powered hydraulic pump. The known actuator comprises a piston supported on a piston rod that extends into the housing of the actuator. The piston forms two hydraulic chambers within the actuator housing. The volume of each chamber is changed by the operation of an associated piezo stack per chamber and a set of valves that selectively enable fluid flow between first and second chambers. An external mechanical brake is also provided at the end of the piston rod to brake its position. A controller controls the operation of the stacks and valves in order to achieve a pumping cycle that results in controlled movement of the piston in the actuator housing.

SUMMARY OF THE INVENTION

An object of the invention is to improve such a hydraulic actuator with regard to a reduced complexity, a higher reliability and a compact design.

For achieving such object, the invention provides a hydraulic actuator according to one or more embodiments described herein. An operating method for such a hydraulic actuator is also described herein.

The invention provides according to a first aspect thereof a hydraulic actuator comprising a housing, a piston, a plurality of pressure chambers, a plurality of arrangements of piezoelectric elements, and a braking means. The housing surrounds a cavity. The piston is arranged on a piston rod and is movable within the cavity along an actuation direction. Each of the arrangements of piezoelectric elements is arranged inside one of the plurality of chambers and is configured to selectively contract or expand in order to change the volume of this chamber occupied by the piezoelectric elements of the arrangement. The braking means is configured for a selectively switching between a braking mode and a non-braking mode. In the braking mode, the braking means brakes movement of the piston. In the non-braking mode, the braking means does not brake movement of the piston. The plurality of pressure chambers includes a first chamber and a second chamber separated by the piston. The plurality of arrangements of piezoelectric elements includes a first arrangement of piezoelectric elements arranged inside the first chamber and configured to change the volume of the first chamber occupied by the piezoelectric elements of the first arrangement. The plurality of arrangements of piezoelectric elements further includes a second arrangement of piezoelectric elements. The braking means comprises a third chamber, a first fluid connection with a first flow control means and a second fluid connection with a second flow control means. The first fluid connection connects the third chamber and the first chamber, and the first flow control means is configured to selectively varying flow of a hydraulic fluid through the first fluid connection. The second fluid connection connects the third chamber and the second chamber, and the second flow control means is configured to selectively vary the flow of hydraulic fluid through the second fluid connection. The second arrangement of piezoelectric elements is arranged inside the third chamber and is configured to change the volume of the third chamber occupied by the piezoelectric elements of the second arrangement.

In some embodiments the plurality of arrangements of piezoelectric elements includes a third arrangement of piezoelectric elements arranged inside the second chamber and configured to change the volume of the second chamber occupied by the piezoelectric elements of the third arrangement.

In some embodiments a diaphragm or membrane is arranged in at least one of the chambers containing an arrangement of piezoelectric elements. The diaphragm or membrane separates the arrangement of piezoelectric elements (such as a piezo stack) from a hydraulic fluid part of the chamber which can be filled with a hydraulic fluid.

In some embodiments, the third chamber is arranged at an axial end of the housing adjacent to one of the first and second chambers.

In some embodiments, the third chamber is arranged radially adjacent to the cavity.

In some embodiments, the third chamber is arranged around the cavity.

In some embodiments, the third chamber is arranged inside the piston which is then a hollow piston.

In some embodiments, the flow control means are selected from a group consisting of valves, active MEMS valves, active disc valves, active one-way disc valves, and magnetorheological valves.

In some embodiments, the first fluid connection comprises a first valve block including at least one first valve as flow control means and at least one first pipe connecting the first valve block with one of the first and third chambers. Another orifice of the valve block can be directly or indirectly connected to the other of the first and third chambers. Optionally, another first pipe connects the first valve block with the other of the first and third chambers.

In some embodiments, the second fluid connection comprises a second valve block including at least one second valve as flow control means and at least one second pipe connecting the second valve block with one of the second and third chambers. Another orifice of the valve block can be directly or optionally indirectly connected to the other of the second and third chambers. Optionally, another second pipe connects the second valve block with the other of the second and third chambers.

In some embodiments, the first fluid connection comprises a first passage in a wall between the first and third chambers. The first passage contains or is formed at least one first valve.

In some embodiments, the second fluid connection comprises a second passage in a wall between the second and third chambers. The second passage contains or is formed at least one second valve.

In some embodiments, the hydraulic actuator further includes a hydraulic fluid reservoir connected to at least the one of the first to third chambers such that hydraulic fluid can flow from the hydraulic fluid reservoir to the chamber or from the chamber to the hydraulic fluid reservoir.

In some embodiments, the hydraulic actuator comprises an electronic control unit configured to control the plurality of arrangements of piezoelectric elements and the first and second flow control means of the braking means. The control unit can be implemented in hardware and/or software. Especially, the control unit comprises a processor and a memory containing a computer program.

In some embodiments, the control unit is configured to command the arrangements of piezoelectric elements and the flow control means to conduct a first operation in order to move the piston in a first actuation direction.

In some embodiments, the first operation has the following sequence of steps a) to d):

a) while the first flow control means is closed, opening the second flow control means, expanding the first arrangement of piezoelectric elements and contracting the second arrangement of piezoelectric elements so that the piston moves in direction to the second chamber, the volume of the second chamber is decreased and hydraulic fluid flows from the second chamber via the second fluid connection to the third chamber;

b) closing the second flow control means;

c) opening the first flow control means, contracting the first arrangement of piezoelectric elements, and expanding the second arrangement of piezoelectric elements so that hydraulic fluid flows from the third chamber via the first fluid connection to the first chamber and the movement of the piston is braked;

d) closing the first flow control means.

In some embodiments, the control unit is configured to command the arrangements of piezoelectric elements and the flow control means to repeat the first operation, i.e., the sequence of steps a) to d), one or several times. Thus, the piston is moved over a longer distance in the first actuating direction.

In some embodiments, the control unit is configured to command the arrangements of piezoelectric elements and the flow control means to conduct a second operation in order to move the piston in a second actuation direction which is directed opposite to the first actuation direction.

According to some embodiments, the second operation has the following sequence of steps e1) to h1):

e1) while the second flow control means is closed, opening the first flow control means, expanding the third arrangement of piezoelectric elements and contracting the second arrangement of piezoelectric elements so that the piston moves in direction to the first chamber, the volume of the first chamber is decreased and hydraulic fluid flows from the first chamber via the first fluid connection to the third chamber;

f1) closing the first flow control means;

g1) opening the second flow control means, contracting the third arrangement of piezoelectric elements, and expanding the second arrangement of piezoelectric elements so that hydraulic fluid flows from the third chamber via the first fluid connection to the first chamber while movement of the piston is braked;

h1) closing the second flow control means.

In some embodiments, the second operation has the following sequence of steps e2) to h2):

e2) while the first flow control means is closed, opening the second flow control means, contracting the first arrangement of piezoelectric elements and expanding the second arrangement of piezoelectric elements so that the piston moves in direction to the first chamber, the volume of the first chamber is decreased and hydraulic fluid flows from the third chamber via the second fluid connection to the second chamber;

f2) closing the second flow control means;

g2) opening the first flow control means, expanding the first arrangement of piezoelectric elements, and contracting the second arrangement of piezoelectric elements so that hydraulic fluid flows from the first chamber via the first fluid connection to the third chamber and the movement of the piston is braked;

h2) closing the first flow control means.

In some embodiments, the control unit is configured to command the arrangements of piezoelectric elements and the flow control means to repeat the second operation, i.e., the sequence of steps e1) to h1 or e2) to h2), one or several times. Thus, the piston is moved over a longer distance in the second actuating direction.

In some embodiments, the first to third chambers and the first and second fluid connection, and optionally the fluid reservoir, form a closed hydraulic fluid volume.

According to another aspect, the invention provides an operation method for automatic operating a hydraulic actuator according to any of the aforementioned embodiments, wherein the operation method comprises the following sequence of steps:

a) while the first flow control means is closed, opening the second flow control means, expanding the first arrangement of piezoelectric elements and contracting the second arrangement of piezoelectric elements so that the piston moves in direction to the second chamber, the volume of the second chamber is decreased and hydraulic fluid flows from the second chamber via the second fluid connection to the third chamber;

b) closing the second flow control means;

c) opening the first flow control means, contracting the first arrangement of piezoelectric elements, and expanding the second arrangement of piezoelectric elements so that hydraulic fluid flows from the third chamber via the first fluid connection to the first chamber and the movement of the piston is braked;

d) closing the first flow control means.

As mentioned above, the sequence of steps a) to d) correspond to a first operation mode for moving the piston in the first actuation direction.

In some embodiments, the operation method further comprises the sequence of steps e1) to h1) or the sequence of steps e2) to h2) as mentioned above. These sequences of steps form a first and second alternative of a second operation mode for moving the piston in the second actuation direction.

In some embodiments, the sequence of steps a) to d) is repeated one or several times for moving the piston in the first actuation direction.

In some embodiments, the sequence of steps e1) to h1) or the sequence of steps e2) to h2) are repeated one or several times for moving the piston in the second actuation direction.

According to another aspect, the invention provides a control unit for a hydraulic actuator according to one of the aforementioned embodiments. The control unit is configured to command the arrangements of piezoelectric elements and the flow control means to conduct the first operation as mentioned above in order to move the piston in a first actuation direction. In some embodiments, the control unit is configured to command the arrangements of piezoelectric elements and the flow control means to conduct the second operation in at least one of its alternatives as mentioned above in order to move the piston in a first actuation direction.

According to another aspect, the invention provides a computer program comprising instructions to cause the hydraulic actuator according to any of the aforementioned embodiments to execute the steps of the operation method according to any of the aforementioned embodiments.

Preferred embodiments of the hydraulic actuator are configured for use on an aircraft. For example, the hydraulic actuator may be configured to move an aircraft control surface or an aircraft door or a flap or a part of a landing gear or a fairing.

According to another aspect, the invention also provides an arrangement comprising a movable part of an aircraft and a hydraulic actuator according to any of the aforementioned embodiments for moving the part. According to another aspect, the invention provides an aircraft comprising a hydraulic actuator according to any of the aforementioned embodiments.

Preferred embodiments of the invention relate to a hydraulic actuator, especially for an aircraft, with arrangements of piezoelectric actuators without a mechanical brake.

Preferred embodiments provide an improved actuator. The improved actuator comprises at least two arrangements of piezoelectric elements, e.g., at least two piezo electric stacks, a piston supported on a piston rod, at least three hydraulic chambers within the actuator, and a plurality of flow control means, such as MEMs valves, to direct hydraulic fluid with the chambers and a controller.

The addition of a third chamber, and a specific configuration of flow control means with a configuration for a specific control methodology provides a selectively operable internal hydraulic brake for the piston.

This enables removal for the need of an external hydraulic power supply (although an external hydraulic power supply may be included in addition for redundancy or commonality). It also enables the position of the position to be held during the piezo pumping process such that many cycles can be performed when extending or retracting the actuator without the need for an external mechanical brake. Known piezoelectric stacks, particularly for piezoelectric pumps, valves and power electronics that are available on the market can be used, e.g., such as offered by the owner of U.S. Pat. No. 7,484,940B2. This reduces development risks, costs and times.

According to preferred embodiments, an external supply of hydraulic pressure to the actuator may be avoided which greatly simplifies the actuator power supply system design. In some embodiments, a hydraulic supply system may be kept to increase the redundancy and commonality for installing the actuator according to preferred embodiments of the invention.

The hydraulic system may comprise more than one hydraulic cycle due to redundancy reasons. A single hydraulic cycle may alternatively be used without increasing the redundancy of the hydraulic system. Additionally, the hydraulic actuator according to preferred embodiments of the invention can be equipped with an additional conventional brake. So, if there should be any problem with a conventional hydraulic pump of the hydraulic system, at least some of the actuators as suggested here may close their brake and may be used as pumps to supply conventional actuators of the hydraulic system with fluid.

In preferred embodiments of the invention, the design is less complex than the state of art—a mechanical external brake can be avoided more reliable—since a mechanical brake is replaced with an internal hydraulic brake operated by fast operating flow control means such as MEMs valves and piezo stacks more compact compared to the state of art designs.

BRIEF DESCRIPTION OF THE DRAWINGS

Embodiments of the invention are explained below referring to the accompanying drawings in which.

DETAILED DESCRIPTION OF THE PREFERRED EMBODIMENTS

Figure 1:
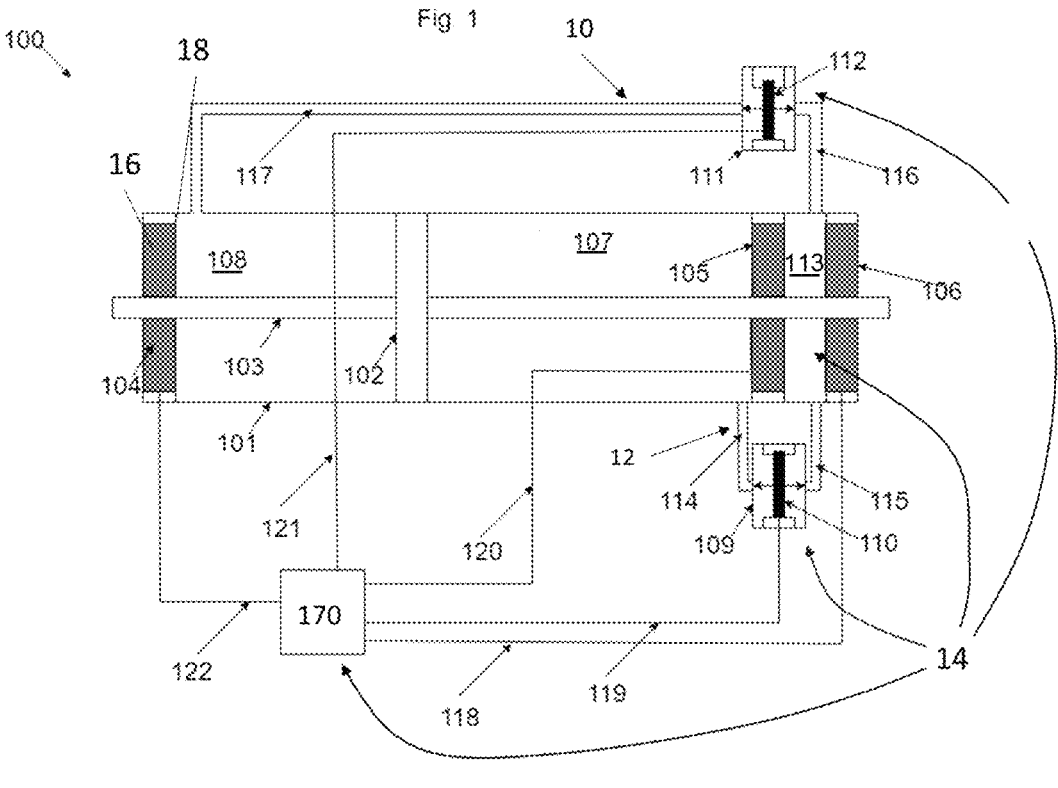
FIG. 1 shows a schematical view of a first embodiment of a hydraulic actuator.

FIGS. 1 to 8 show a first to an eight embodiment of a hydraulic actuator 100, 200, 300, 400, 500, 600, 700, 800, especially for an aircraft. The hydraulic actuator comprises a housing 101, 201, 301, 401, 501, 601, 701, 801 surrounding a cavity, a piston 102, 202, 302, 402, 502, 602, 702, 802 arranged on a piston rod 103, 203, 303, 403, 503, 603, 703, 803, a first to third pressure chamber 108, 107, 113; 208, 207, 213; 308, 307, 331; 408, 407, 409; 508, 507, 513; 608, 607, 613; 708, 707, 731; 808, 807; 809, a plurality of arrangements of piezoelectric elements 104, 105, 106; 204, 206; 304, 305; 404, 405, 450, 451; 504, 505, 506; 604, 606; 704, 705; 804; 805, 850, 851, and an electronic control unit 170, 270, 370, 470, 570, 670, 770, 870.

The first chamber 108, 208, 308, 408, 508, 608, 708, 808 and the second chamber 107, 207, 307, 407, 507, 607, 707, 807 are arranged in the cavity and separated by the piston 102, 202, 302, 402, 502, 602, 702, 802. The piston 102, 202, 302, 402, 502, 602, 702, 802 is movable along an actuation direction.

Each of the arrangements is arranged inside one of the first to third chambers 107, 207, 307, 407, 507, 607, 707, 807; 108, 208, 308, 408, 508, 608, 708, 808; 113, 213, 331, 409, 513, 613, 731, 809 and configured to selectively contract or expand in order to change the volume of this chamber 107, 207, 307, 407, 507, 607, 707, 807; 108, 208, 308, 408, 508, 608, 708, 808; 113, 213, 331, 409, 513, 613, 731, 809 occupied by the piezoelectric elements of the arrangement.

In the embodiments shown, each arrangement of piezoelectric elements 104, 105, 106; 204, 206; 304, 305; 404, 405, 450, 451; 504, 505, 506; 604, 606; 704, 705; 804; 805, 850, 851 includes a piezoelectric stack 16 and a diaphragm 18 or membrane. The diaphragm 18 separates the chamber in which the arrangement is arranged into a fluid compartment for hydraulic fluid and a compartment for the piezoelectric stack. By contracting or expanding of the piezoelectric stack, the diaphragm 18 is moved so that the volume of the fluid compartment is changed.

The plurality of arrangements of piezoelectric elements includes at least a first arrangement of piezoelectric elements 104, 204, 304, 404, 504, 604, 704, 804 and a second arrangement of piezoelectric elements 106, 206, 332, 450-453, 506, 606, 732, 850-853.

The first arrangement of piezoelectric elements 104, 204, 304, 404, 504, 604, 704, 804 is arranged inside the first chamber 108, 208, 308, 408, 508, 608, 708, 808 and configured to change the volume of the first chamber occupied by the piezoelectric elements of the first arrangement. The second arrangement of piezoelectric elements 106, 206, 332, 450-453, 506, 606, 732, 850-853 is arranged inside the third chamber 113, 213, 331, 409, 513, 613, 731, 809 and is configured to change the volume of the third chamber occupied by the piezoelectric elements of the second arrangement.

Further, the hydraulic actuator hydraulic actuator 100, 200, 300, 400, 500, 600, 700, 800 comprises a computer-implemented internal hydraulic braking means 14. The braking means 14 comprises the third chamber 113, 213, 331, 409, 513, 613, 731, 809, a first fluid connection 10 with a first flow control means 112, 212, 340, 341, 460, 461, 512, 612, 740, 741, 860, 861, a second fluid connection 12 with a second flow control means 110; 210; 342, 343; 462, 463; 510; 610; 742, 743; 862, 863, and a computing means.

The braking means 14 is configured for a selectively switching between a braking mode and a non-braking mode, wherein in the braking mode the braking means brakes movement of the piston 102, 202, 302, 402, 502, 602, 702, 802 and in the non-braking mode does not brake movement of the piston.

In the embodiments shown, the first fluid connection 10 connects the third chamber 113, 213, 331, 409, 513, 613, 731, 809 and the first chamber 108, 208, 308, 408, 508, 608, 708, 808. The first flow control means 112, 212, 340, 341, 460, 461, 512, 612, 740, 741, 860, 861 is configured to selectively varying flow of a hydraulic fluid through the first fluid connection 10.

The second fluid connection 12 connects the third chamber 113, 213, 331, 409, 513, 613, 731, 809 and the second chamber 107, 207, 307, 407, 507, 607, 707, 807. The second flow control means 110; 210; 342, 343; 462, 463; 510; 610; 742, 743; 862, 863 is configured to selectively vary the flow of hydraulic fluid through the second fluid connection 12.

The first and second flow control means 112, 212, 340, 341, 460, 461, 512, 612, 740, 741, 860, 861; 110; 210; 342, 343; 462, 463; 510; 610; 742, 743; 862, 863 are selected from a group consisting of valves, active MEMS valves, active disc valves, active one-way disc valves, and magnetorheological valves. In the embodiments shown, the flow control means are MEMs valves.

In the embodiments shown, the computing means is a part, such as a part of a computer program, of the control unit 170, 270, 370, 470, 570, 670, 770, 870. The computing means is configured to control the flow control means in order to selectively switch between the braking mode and the non-braking mode.

Figure 4:
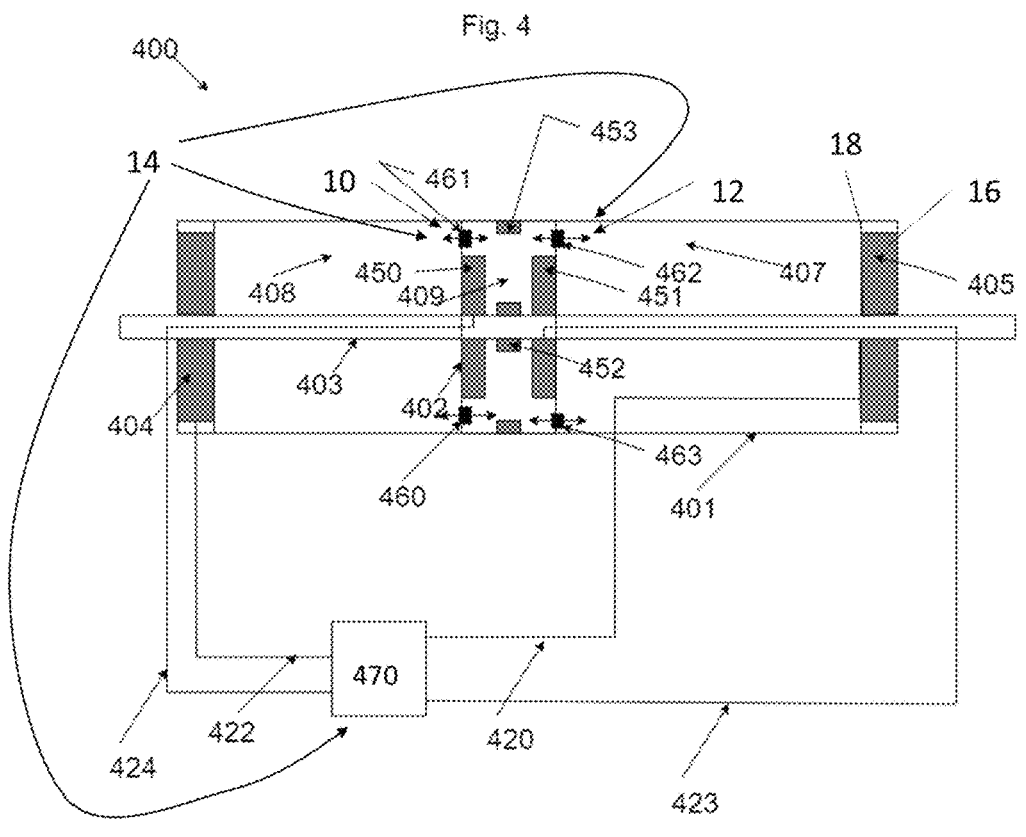
FIG. 4 shows a schematical view of a fourth embodiment of a hydraulic actuator.
Figure 5:
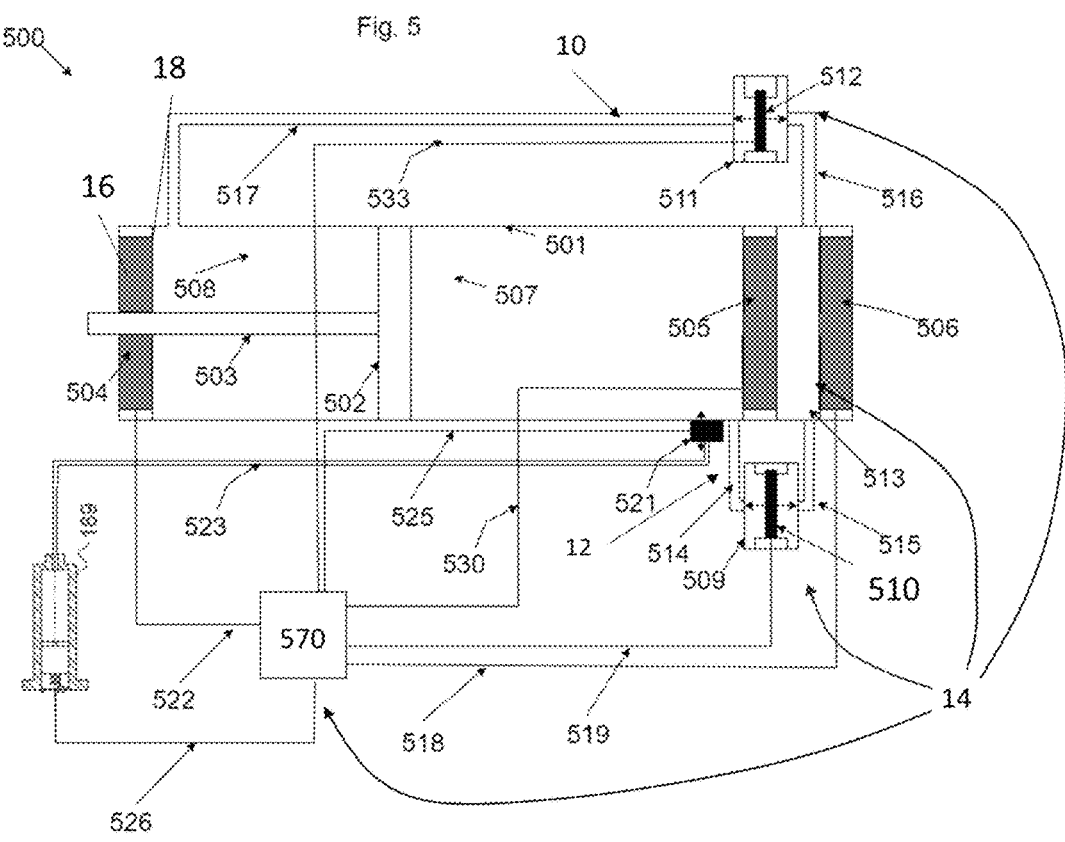
FIG. 5 shows a schematical view of a fifth embodiment of a hydraulic actuator.
Figure 6:
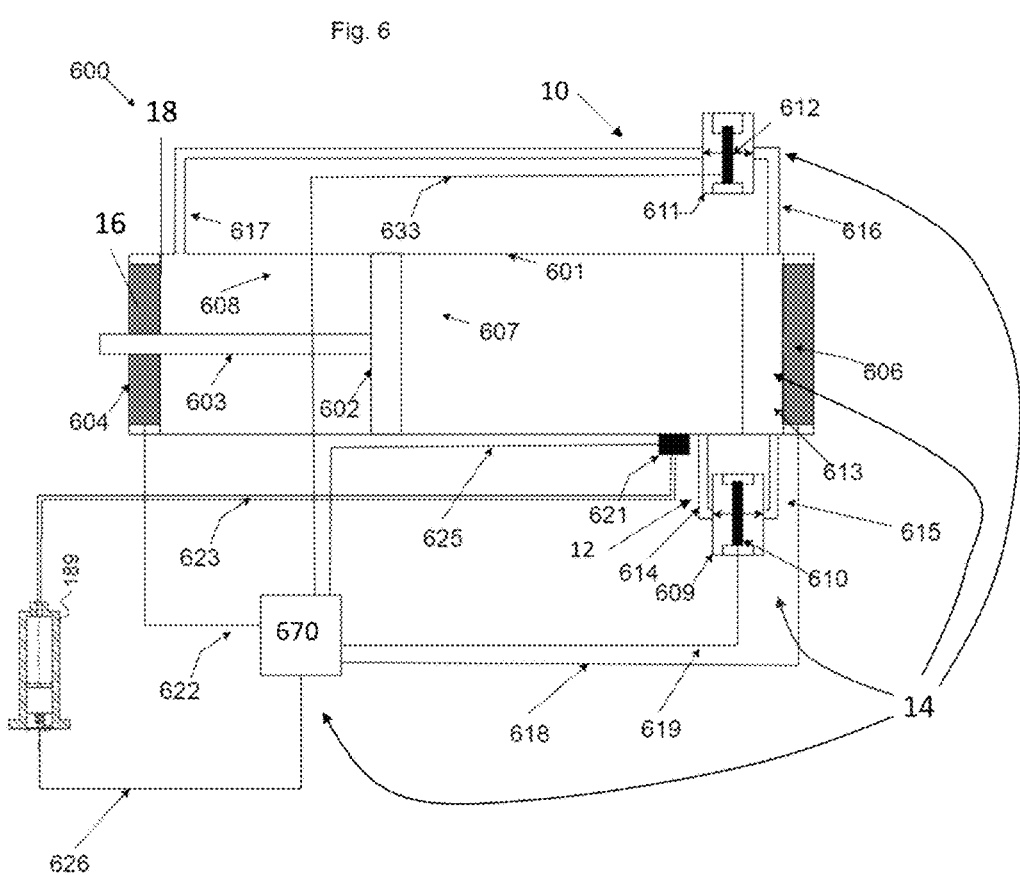
FIG. 6 shows a schematical view of a sixth embodiment of a hydraulic actuator.

Referring to FIGS. 1, 3-5, and 7-8, the plurality of arrangements of piezoelectric elements includes a third arrangement of piezoelectric elements 105, 305, 405, 505, 704, 804 arranged inside the second chamber 107, 307, 407, 507, 707, 807 and configured to change the volume of the second chamber occupied by the piezoelectric elements of the third arrangement. Referring to FIGS. 2 and 6, these third arrangement of piezoelectric elements may be omitted.

Referring to the FIG. 1 to 8 eight embodiments of the actuator 100, 200, 300, 400, 500, 600, 700, 800 are shown each comprising a third chamber, flow control means, especially valves, and piezo configurations that provide a less complex and compact design of a hydraulic actuator which may be operated without an outer hydraulic system.

In preferred embodiments, the arrangements of piezoelectric elements comprise piezo stacks. A neutral position of the piezo stack is the power off position, and therefore determines the start and end position of the piezo stack.

In the following, the first embodiment of the hydraulic actuator 100 and a preferred operation mode thereof is described in more detail with reference to FIG. 1.

Figure 2:
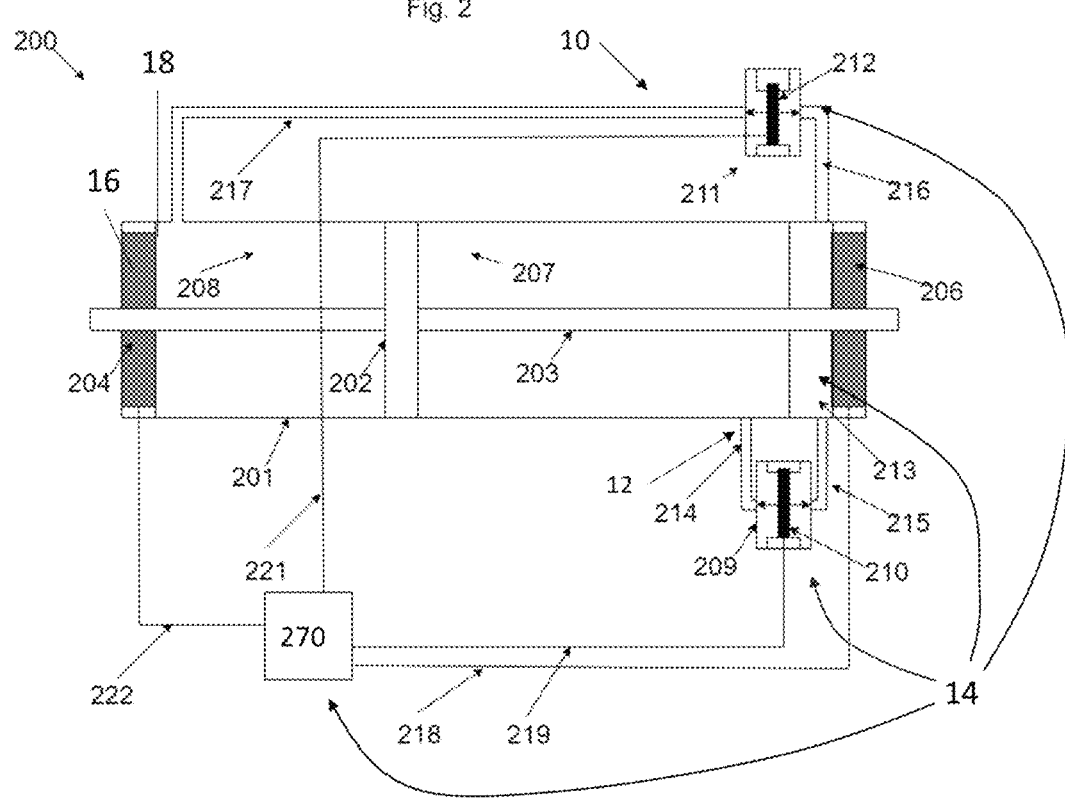
FIG. 2 shows a schematical view of a second embodiment of a hydraulic actuator.

In accordance with FIG. 1 the actuator 100 comprises the housing 101, the piston rod 103 and the piston 102, which divides the housing 101 and the hydraulic fluid in the first chamber 108 and the second chamber 107. Also, there is the third chamber 113. The third chamber 113 is located at an end of the housing 101, axially adjacent to the second chamber 107.

The first fluid connection 10 comprises a first valve block 109 including a first valve—in form of a MEMs valve—as first flow control means 112 and a first pipe 114 connecting the first valve block 109 with the second chambers 107 and a further first pipe 115 connecting the valve block 109 with the third chamber 113.

The second fluid connection 12 comprises a second valve block 111 including a second valve—in form of a MEMs valve—as second fluid control means 110 and a second pipes 117 connecting the second valve block 111 with the first chambers 108 and a further second pipe 116 connecting the second valve block 111 with the third chamber.

In the following, an operation of the hydraulic actuator 100 for moving the piston 102 from the left to the right in FIG. 1—example for first actuation direction—is described.

At the start, all flow control means 110, 112 are closed and all the arrangements of piezoelectric elements 104, 106, 105—referred to as piezoelectrical stacks 104, 106, 105 in the following—are in the neutral position.

a) First Step:

To move the piston 102 from the left to the right in FIG. 1, the control unit 170 commands the first piezoelectrical stack 104 to expand from its neutral position over a first cable 122 (or any other first communication link). Simultaneously, the control unit 170 opens the second flow control means 110—so called MEM-valve—in the second valve block 109 over a second cable 119 (or any other second communication link) and commands the second piezoelectrical stack 106 to contract from its neutral position over a third cable 118 (or any other third communication link). The piston 102 moves to the right, lessens the second chamber 107 and hydraulic fluid flows from the second chamber 107 over the second pipes 114 and 115 through the open second flow control means 110 to the third chamber 113. This step a) implies that the braking means 14 is in the non-braking mode.

b) Second Step:

In the next step the control unit 170 closes the second flow control means 110.

c) Third Step:

Then the control unit 170 commands simultaneously the first piezoelectrical stack 104 to contract, the third piezoelectrical stack 105 to expand fully and the first flow control means 112—MEM-valve—in the first valve block 109 to open over the cables 118, 121 and 122 (or any other communication link). Hydraulic fluid flows now from the third chamber 113 to the first chamber 108 over the first pipes 117 and 116. This step c) implies that the braking means 14 is in the braking mode.

d) Fourth Step:

The control unit 170 closes the first flow means 112.

Now it begins with the first step a) again. The difference in following first steps a) is, that the first piezoelectric stack 104 expands not from its neutral position, but from its contracted position to its fully expanded position and that the second piezoelectrical stack 106 contracts not from its neutral position, but from its fully expanded position to its fully contracted position.

In the following, an operation of the hydraulic actuator 100 for moving the piston 102 from the right to the left in FIG. 1—example for second actuation direction—is described.

At the start, all flow control means 110, 112 are closed and all the arrangements of piezoelectric elements 104, 106, 105—referred to as piezoelectrical stacks 104, 106, 105 in the following—are in the neutral position.

e1) First Step:

To move the piston 102 from the right to the left in FIG. 1, the control unit 170 commands the piezoelectrical stack 105 to expand from its neutral position over a fourth cable 120, simultaneously the control unit 170 opens the first flow control means 112—so-called active MEM-valve—in the first valve block 109 over a fifth cable 121 and commands the second piezoelectrical stack 106 to contract from its neutral position over the third cable 118. The piston 102 moves to the left, lessens the first chamber 108 and hydraulic fluid flows from the first chamber 108 over the first pipes 117 and 116 through the open first flow control means 112 to the third chamber 113. This step e1) implies that the brake means 14 is in the non-braking mode.

f1) Second Step:

In the next step the control unit 170 closes the first flow control means 112.

g1) Third Step:

Then the control unit 170 commands simultaneously the third piezoelectrical stack 105 to contract, the second piezoelectrical stack 106 to expand fully and the second flow control means 110—MEM-valve—in the second valve block 109 to open over the cables 119, 121 and 122. Hydraulic fluid flows now from the third chamber 113 to the second chamber 107. This step g1) is a further example of a braking mode.

h1) Fourth Step:

The control unit 170 closes the second flow control means 110.

Now it begins with the first step e1) again. The difference in following first steps e1) is, that the third piezoelectrical stack 105 expands not from its neutral position, but from its contracted position to its fully expanded position and that the second piezoelectrical stack 106 contracts not from its neutral position, but from its fully expanded position to its fully contracted position.

At the end of both operations of moving in the first or second actuation direction, when the piston 102 has reached its end position, the piezoelectrical stacks 104 and 106 move from their actual position, extended or retracted, back to their neutral positions, i.e., commanded by the control unit 170. The flow control means 110 and 112 are controlled in an appropriate way by the control unit 170, i.e., the flow control means 110 and 112 are closed, after the piezoelectrical stacks 104 and 106 have reached their neutral position. Corresponding steps can be conducted when the piston 202, 302, 402, 502, 602, 702, 802 has reached on of its end positions in the second to eighth embodiment.

In the following, the second embodiment of the hydraulic actuator 200 and a preferred operation mode thereof is described in more detail with reference to FIG. 2.

In accordance with FIG. 2 the actuator 200 comprises the housing 201, the piston rod 203 and the piston 202, which divides the housing 201 and the hydraulic fluid in the first chamber 208 and the second chamber 207. Also, there is the third chamber 213. As in the first embodiment, the third chamber 213 is located at the end of the housing 201. The second embodiment contains only the first and second arrangements of piezoelectric elements—referred to as first piezoelectric stack 204 and second piezoelectric stack 206 in the following.

In the following, an operation of the hydraulic actuator 200 for moving the piston 202 from the left to the right in FIG. 2—example for first actuation direction—is described.

At the start, all flow control means 210, 212 are closed (braking mode switched on) and all the piezoelectrical stacks 204, 206 are in the neutral position.

a) First Step:

To move the piston 202 from the left to the right in FIG. 2, the control unit 270 commands the first piezoelectrical stack 204 to expand from its neutral position over cable 222, simultaneously the control unit 270 opens the second flow control means 210—called active MEM-valve—in the second valve block 209 over the cable 219 and commands the second piezoelectrical stack 206 to contract from its neutral position over the cable 218. The piston 202 moves to the right, lessens the second chamber 207 and hydraulic fluid flows from the second chamber 207 over the second pipes 214 and 215 through the open second flow control means 210 to the third chamber 213.

b) Second Step:

In the next step the control unit 270 closes the second control means 210.

c) Third Step:

Then the control unit 270 commands simultaneously the first piezoelectrical stack 204 to contract, the second piezoelectrical stack 206 to expand fully and the first flow control means 212—MEM-valve—in the first valve block 211 to open over the cables 218, 221 and 222. Hydraulic fluid flows now from the third chamber 213 to the first chamber 270 over the first pipes 217 and 216.

d) Fourth Step:

The control unit 270 closes the first flow control means 212.

Now it begins with the first step a) again, with the differences as already described above for the first embodiment.

In the following, an operation of the hydraulic actuator 200 for moving the piston 202 from the right to the left in FIG. 2—example for second actuation direction—is described.

At the start, all flow control means 210, 212 are closed and all the piezoelectrical stacks 204, 206 are in the neutral position.

e2) First Step:

To move the piston 202 from the right to the left the control unit 270 commands the first piezoelectrical stack 204 to contract from its neutral position over cable 222, simultaneously the control unit 270 opens the second flow control means 210—active MEM-valve—in the second valve block 209 over the cable 219 and commands the second piezoelectrical stack 206 to expand from its neutral position over cable 218. The piston 202 moves to the left, lessens the first chamber 208 and hydraulic fluid flows from the third chamber 213 over the second pipes 215 and 214 through the open second flow control means 210 to the second chamber 207. This also implies that the braking means is switched in the non-braking mode.

f2) Second Step:

In the next step the control unit 270 closes the second flow control means 210.

g2) Third Step:

Then the control unit 270 commands simultaneously the first piezoelectrical stack 204 to expand fully, the second piezoelectrical stack 206 to contract fully and the first flow control means 212—MEM-valve—in the first valve block 211 to open over the cables 222, 221 and 218. Hydraulic fluid flows now from the first chamber 208 to the third chamber 213 through the first pipes 217 and 216. This also implies that the braking means 14 is switched in the braking mode.

h2) Fourth Step:

The control unit 270 closes the first flow control means 212.

Now it begins with the first step e2) again. The difference in following first steps e2) is, that the first piezoelectrical stack 204 contracts not from its neutral position, but from its expanded position to its fully contracted position and that the second piezoelectrical stack 206 expands not from its neutral position, but from its fully contracted position to its fully contracted position.

In the following, the third embodiment of the hydraulic actuator 300 and a preferred operation mode thereof is described in more detail with reference to FIG. 3.

Figure 3:
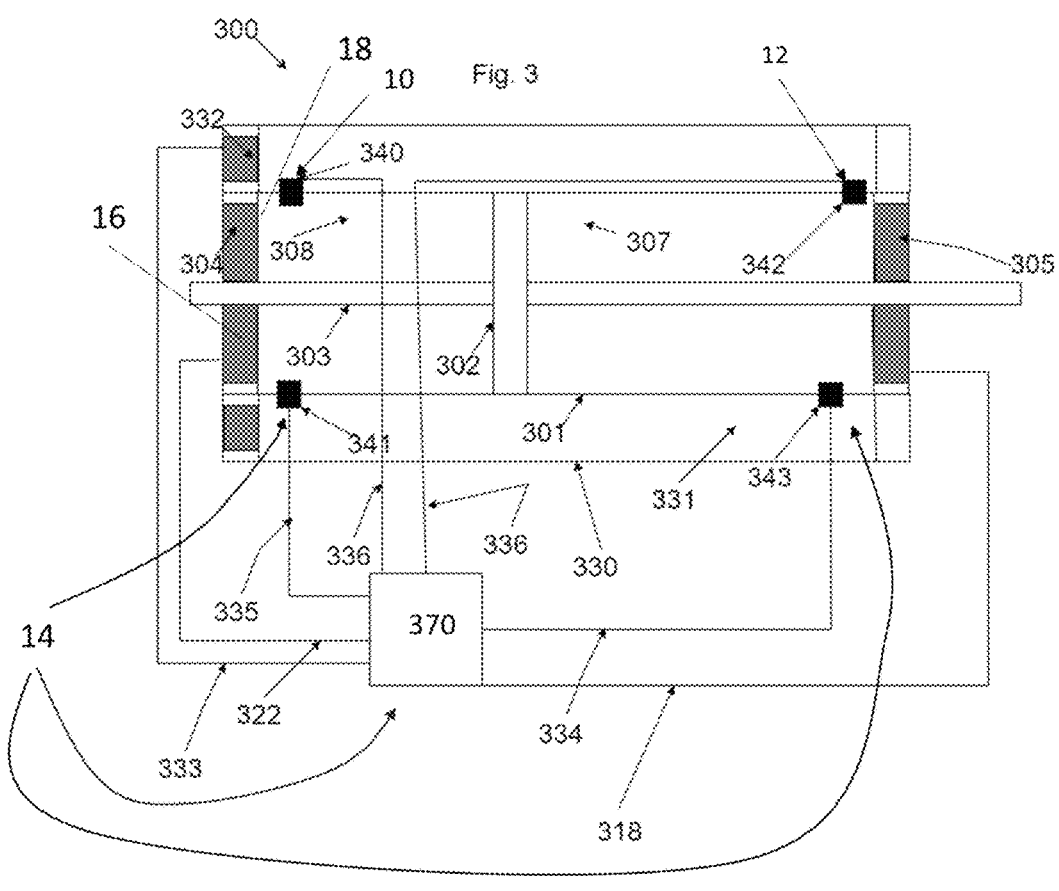
FIG. 3 shows a schematical view of a third embodiment of a hydraulic actuator.

In accordance with FIG. 3 the actuator 300 compromises the housing 301, the piston rod 303 and the piston 302, which divides the housing 301 and the hydraulic fluid in the first chamber 308 and the second chamber 307. Also, there is the third chamber 331, in difference to the first and second embodiments of FIGS. 1 and 2 not behind second chamber 307, but around the housing 301 as a hollow cylinder 330. The valve blocks 109 and 111 are not needed, because the first flow control means 340, 341 and the second flow control means 342, 343—here in the form of MEM-valves—can be integrated in the housing 301. The first and second fluid connections 10, 12 are in the form of fluid passages in a wall between the housing 301 and the hollow cylinder 330 that can be opened and closed by the flow control means 340-343.

In the following, an operation of the hydraulic actuator 300 for moving the piston 302 from the left to the right in FIG. 3—example for first actuation direction—is described.

At the start, all flow control means 340-343 are closed and all the arrangements of piezoelectric elements 304, 332, 305—referred to as first to third piezoelectrical stacks 304, 332, 305 in the following—are in the neutral position.

a) First Step:

To move the piston 302 from the left to the right in FIG. 3 the control unit 370 commands the first piezoelectrical stack 304 to expand from its neutral position over cable 322, simultaneously the control unit 370 opens the second flow control means 342, 343—so-called active MEM-valves—in housing 301 over the cable 334 and 336 and commands the second piezoelectrical stack 332 to contract from its neutral position over the cable 333. The piston 302 moves to the right, lessens the second chamber 307 and hydraulic fluid flows from the second chamber 307 through the open second flow control means 342 and 343 to the third chamber 331.

b) Second Step:

In the next step the control unit 370 closes the second flow control means 342 and 343.

c) Third Step:

Then the control unit 370 commands simultaneously the first piezoelectrical stack 304 to contract, the second piezoelectrical stack 332 to expand fully and the first flow control means 340 and 341—MEM-valves—in the housing 301 to open over the cables 333, 335 and 336 and 322.

Hydraulic fluid flows now from the third chamber 331 to the first chamber 308 over the first flow control means 341 and 340.

d) Fourth Step:

The control unit 370 closes the first flow control means 340 and 341.

Now it begins with the first step a) again. The difference in following first steps a) is, that the first piezoelectrical stack 304 expands not from its neutral position, but from its contracted position to its fully expanded position and that the second piezoelectrical stack 332 contracts not from its neutral position, but from its fully expanded position to its fully contracted position.

In the following, an operation of the hydraulic actuator 300 for moving the piston 302 from the right to the left in FIG. 3—example for second actuation direction—is described.

At the start, all flow control means 340-343 are closed and all piezoelectrical stacks 304, 332, 305 are in the neutral position.

e1) First Step:

To move the piston 302 from the right to the left the control unit 370 commands the third piezoelectrical stack 305 to expand from its neutral position over cable 318, simultaneously the control unit 370 opens the first flow control means 340, 341—so-called active MEM-valves—in the housing 301 over the cables 335 and 336 and commands the second piezoelectrical stack 332 to contract from its neutral position over cable 333. The piston 302 moves to the left, lessens the first chamber 308 and hydraulic fluid flows from the first chamber 308 through the open first flow control means 340 and 341 to the third chamber 331.

f1) Second Step:

In the next step the control unit 370 closes the first flow control means 340 and 341.

g1) Third Step:

Then the control unit 370 commands simultaneously the third piezoelectrical stack 305 to contract, the second piezoelectrical stack 332 to expand fully and the second flow control means 342 and 343—MEM-valves—in the housing 301 to open over the cables 318, 334 and 336. Hydraulic fluid flows now from the third chamber 331 to the second chamber 307.

h1) Fourth Step:

The control unit 370 closes the second flow control means 342 and 343.

Now it begins with the first step again e1). The difference in following first steps e1) is, that the third piezoelectrical stack 305 expands not from its neutral position, but from its contracted position to its fully expanded position and that the second piezoelectrical stack 332 contracts not from its neutral position, but from its fully expanded position to its fully contracted position.

In the following, the fourth embodiment of the hydraulic actuator 400 and a preferred operation mode thereof is described in more detail with reference to FIG. 4.

In accordance with FIG. 4 the actuator 400 compromises the housing 401, the piston rod 403 and the piston 402, configured as hollow piston 402, which divides the housing 401 and the hydraulic fluid in the first chamber 408 and the second chamber 407. Also, there is the third chamber 409, but here placed in the hollow piston 402, in difference to FIG. 1.

The fluid connections 10, 12 are formed as passages between the hollow piston 402 and the first and second chambers 408, 407 wherein these passages can be closed by flow control means 461-463 formed as active MEM-valves integrated in the piston 402. The second arrangement of piezoelectric elements includes piezoelectrical stacks 450-453 in the hollow piston 402.

In the following, an operation of the hydraulic actuator 400 for moving the piston 402 from the left to the right in FIG. 4—example for first actuation direction—is described.

At the start, all flow control means 460-463 are closed and all the arrangements of piezoelectric elements 404, 450-453, 405—referred to as first to third piezoelectrical stacks 404, 450-453, 405 in the following—are in the neutral position.

a) First Step:

To move the hollow piston 402 from the left to the right the control unit 470 commands the first piezoelectrical stack 404 to expand from its neutral position over cable 422, simultaneously the control unit 470 opens the second flow control means 462, 463—called active MEM-valves—over not shown cables and commands the second piezoelectrical stacks 450, 451, 452 and/or 453 to contract from their neutral position over cables 423 and 424. The piston 402 moves to the right, lessens the second chamber 407 and hydraulic fluid flows from the second chamber 407 through the open second flow control means 462 and 463 to the third chamber 409.

b) Second Step:

In the next step the control unit 470 closes the second flow control means 462 and 463.

c) Third Step:

Then the control unit 470 commands simultaneously the first piezoelectrical stack 404 to contract, the second piezoelectrical stacks 450, 451, 452 and/or 453 to expand fully and the first flow control means 460, 461—MEM-valves—to open over not shown cables. Hydraulic fluid flows now from the third chamber 409 to the first chamber 408.

d) Fourth Step:

The control unit 470 closes the first flow control means 460 and 461.

Now it begins with the first step again a). The difference in following first steps a) is, that the first piezoelectrical stack 404 expands not from its neutral position, but from its contracted position to its fully expanded position and that the second piezoelectrical stacks 450, 451, 452 and 453 contract not from their neutral position, but from their fully expanded position to their fully contracted position.

In the following, an operation of the hydraulic actuator 400 for moving the piston 402 from the right to the left in FIG. 4—example for second actuation direction—is described.

At the start, all flow control means 460-463 are closed and all piezoelectrical stacks 404, 450-453, 405 are in the neutral position.

e1) First Step:

To move the piston 402 from the right to the left the control unit 470 commands the third piezoelectrical stack 405 to expand from its neutral position over cable 420, simultaneously the control unit 470 opens the first flow control means 460, 461—so-called active MEM-valves—in the piston 402 over a not shown cable and commands the second piezoelectrical stacks 450, 451, 452 and/or 453 to contract from their neutral position over the cables 423 and 424. The piston 402 moves to the left, lessens the first chamber 408 and hydraulic fluid flows from the first chamber 408 through the open first flow control means 460 and 461 to the third chamber 409.

f1) Second Step:

In the next step the control unit 470 closes the first flow control means 460 and 461.

g1) Third Step:

Then the control unit 470 commands simultaneously the third piezoelectrical stack 405 to contract, the second piezoelectrical stacks 450, 451, 452 and/or 453 to expand fully and the second flow control means 462 and 463—MEM-valves—in the piston 402 to open over the cables 420, 423 and 424. Hydraulic fluid flows now from the third chamber 409 to the second chamber 407.

h1) Fourth Step:

The control unit 470 closes the second flow control means 462 and 463.

Now it begins with the first step e1) again. The difference in following first steps a1) is, that the third piezoelectrical stack 405 expands not from its neutral position, but from its contracted position to its fully expanded position and that the piezoelectrical stacks 450, 451, 452 and/or 453 contract not from their neutral position, but from their fully expanded position to their fully contracted position.

Figure 7:
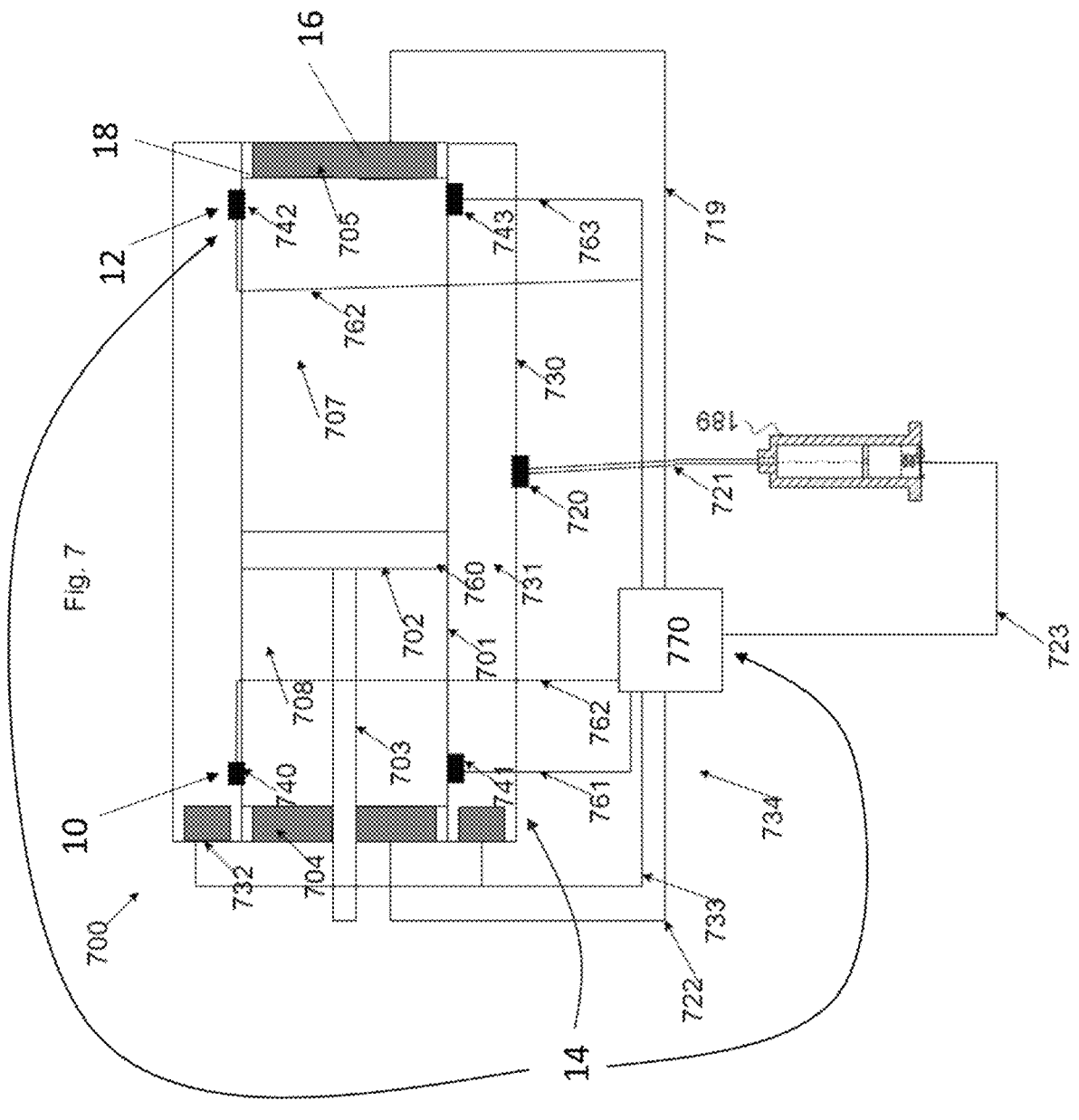
FIG. 7 shows a schematical view of a seventh embodiment of a hydraulic actuator.
Figure 8:
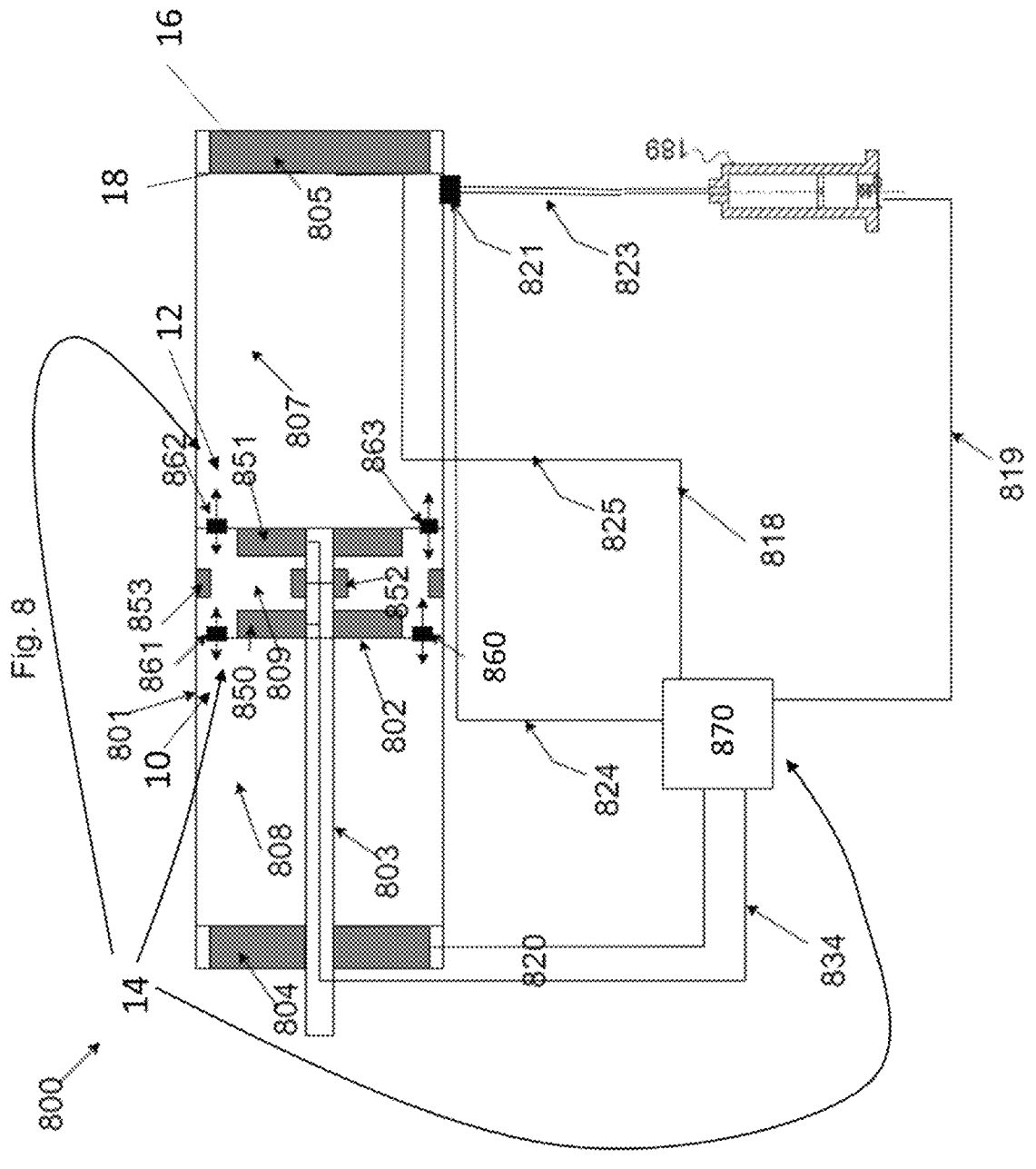
FIG. 8 shows a schematical view of an eight embodiment of a hydraulic actuator.

In the following, fifth to eighth embodiments of the hydraulic actuator 500, 600, 700, 800 are described with reference to FIGS. 5 to 8. The FIGS. 5, 6, 7 and 8 are similar to FIGS. 1, 2, 3 and 4. Especially, the fifth embodiment of FIG. 5 is very similar to the first embodiment of FIG. 1; the sixth embodiment of FIG. 6 is very similar to the second embodiment of FIG. 2; the seventh embodiment of FIG. 7 is very similar to the third embodiment of FIG. 3; and the eighth embodiment of FIG. 8 is very similar to the fourth embodiment of FIG. 4.

But in difference to the first to fourth embodiments, the piston rods 503, 603, 703 and 803 of the fifth to eighth embodiment do not extend into the second chambers 507, 607, 707, 807. So, a hydraulic fluid reservoir 189 is needed. The reservoir 189 of the fifth to eighth embodiments is the same as this of FIG. 11 of EP3324055B1 and is also known from US2007/0129681A1. The reservoir 189 can be controlled by the control unit 570, 670, 770, 870 via a cable 526, 626, 723, 819 In the fifth, sixth and eighth embodiment, the fluid reservoir 189 is connected via a pipe 523, 623, 823 and a third flow control means, especially a third valve 521, 621, 821 to the second chamber 507, 607, 807. The third valve 521, 621, 821 can be controlled by the control unit 570, 670, 870 via a cable 525, 625, 824. In the seventh embodiment, the fluid reservoir 189 is connected via a pipe 721 and a third flow control means, especially a third valve 720 to the second chamber 707. The third valve 720 can be controlled by the control unit 770 via a not shown cable.

In the following, the fifth embodiment of the hydraulic actuator 500 and a preferred operation mode thereof is described in more detail with reference to FIG. 5.

In accordance with FIG. 5 the actuator 500 comprises the housing 501, the piston rod 503 and the piston 502, which divides the housing 501 and the hydraulic fluid in the first chamber 508 and the second chamber 507. Also, there is the third chamber 513. The third chamber 513 is located at an end of the housing 501, axially adjacent to the second chamber 507.

The first fluid connection 10 comprises a first valve block 509 including a first valve 510—in form of a MEMs valve—as first flow control means and a first pipe 514 connecting the first valve block 509 with the second chambers 507 and a further first pipe 515 connecting the valve block 509 with the third chamber 513.

The second fluid connection 12 comprises a second valve block 511 including a second valve 512—in form of a MEMs valve—as second fluid control means and a second pipes 517 connecting the second valve block 511 with the first chambers 508 and a further second pipe 516 connecting the second valve block 511 with the third chamber.

In the following, an operation of the hydraulic actuator 100 for moving the piston 502 from the left to the right in FIG. 5—example for first actuation direction—is described.

At the start, all flow control means 510, 512 are closed and all the arrangements of piezoelectric elements 504, 506, 505—referred to as piezoelectrical stacks 504, 506, 505 in the following—are in the neutral position.

a) First Step:

To move the piston 502 from the left to the right in FIG. 5, the control unit 570 commands the first piezoelectrical stack 504 to expand from its neutral position over a first cable 522 (or any other first communication link). Simultaneously, the control unit 570 opens the second flow control means 510—so called MEM-valve—in the second valve block 509 over a second cable 519 (or any other second communication link) and commands the second piezoelectrical stack 506 to contract from its neutral position over a third cable 518 (or any other third communication link) and the reservoir 189 to expand a step size over cable 526 (or over another communication link) and to open the third valve 521—MEM-valve—over cable 525 (example for communication link). The piston 502 moves to the right, lessens the second chamber 507 and hydraulic fluid flows from the second chamber 507 over the second pipes 514 and 515 through the open second flow control means 510 to the third chamber 513 and through the pipe 523 to the reservoir 189. This step a) implies that the braking means 14 is in the non-braking mode.

b) Second Step:

In the next step the control unit 570 closes the second flow control means 510.

c) Third Step:

Then the control unit 570 commands simultaneously the first piezoelectrical stack 504 to contract, the third piezo-electrical stack 506 to expand fully and the first flow control means 512—MEM-valve—in the first valve block 511 to open over the cables 518, 521 and 522 (or any other communication link). Hydraulic fluid flows now from the third chamber 513 to the first chamber 508 over the first pipes 517 and 516. This step c) implies that the braking means 14 is in the braking mode.

d) Fourth Step:

The control unit 570 closes the first flow means 512.

Now it begins with the first step a) again. The difference in following first steps a) is, that the first piezoelectric stack 504 expands not from its neutral position, but from its contracted position to its fully expanded position and that the second piezoelectrical stack 506 contracts not from its neutral position, but from its fully expanded position to its fully contracted position. The step size of the reservoir 189 has to be doubled in the first step a).

In the following, an operation of the hydraulic actuator 500 for moving the piston 502 from the right to the left in FIG. 5—example for second actuation direction—is described.

At the start, all flow control means 510, 512, 521 are closed and all the arrangements of piezoelectric elements 504, 506, 505—referred to as piezoelectrical stacks 504, 506, 505 in the following—are in the neutral position.

e1) First Step:

To move the piston 502 from the right to the left in FIG. 5, the control unit 570 commands the piezoelectrical stack 505 to expand from its neutral position over a fourth cable 520, simultaneously the control unit 570 opens the first flow control means 512—so-called active MEM-valve—in the first valve block 511 over a fifth cable 533 and commands the second piezoelectrical stack 506 to contract from its neutral position over the third cable 518. The piston 502 moves to the left, lessens the first chamber 508 and hydraulic fluid flows from the first chamber 508 over the first pipes 517 and 516 through the open first flow control means 512 to the third chamber 513. This step e1) implies that the brake means 14 is in the non-braking mode.

f1) Second Step:

In the next step the control unit 570 closes the first flow control means 512.

g1) Third Step:

Then the control unit 570 commands simultaneously the third piezoelectrical stack 505 to contract, the second piezo-electrical stack 506 to expand fully and the second flow control means 510—MEM-valve—in the second valve block 509 to open over the cables 519, 530 and 518 and to contract the reservoir 189 a step size and to open the third valve 521. Hydraulic fluid flows now from the third chamber 513 and the reservoir 189 to the second chamber 507. This step g1) is a further example of a braking mode.

h1) Fourth Step:

The control unit 570 closes the second flow control means 510 and the third valve 521.

Now it begins with the first step e1) again. The difference in following first steps e1) is, that the third piezoelectrical stack 505 expands not from its neutral position, but from its contracted position to its fully expanded position and that the second piezoelectrical stack 506 contracts not from its neutral position, but from its fully expanded position to its fully contracted position. The step size of the reservoir 189 in the third step g1 has to be doubled.

In the following, the sixth embodiment of the hydraulic actuator 600 and a preferred operation mode thereof is described in more detail with reference to FIG. 6.

In accordance with FIG. 6 the actuator 600 comprises the housing 601, the piston rod 603 and the piston 602, which divides the housing 601 and the hydraulic fluid in the first chamber 608 and the second chamber 607. Also, there is the third chamber 613. As in the first embodiment, the third chamber 613 is located at the end of the housing 601. The second embodiment contains only the first and second arrangements of piezoelectric elements—referred to as first piezoelectric stack 604 and second piezoelectric stack 606 in the following.

In the following, an operation of the hydraulic actuator 600 for moving the piston 606 from the left to the right in FIG. 6—example for first actuation direction—is described.

At the start, all flow control means 610, 612 are closed (braking mode switched on) and all the piezoelectrical stacks 604, 606 are in the neutral position.

a) First Step:

To move the piston 602 from the left to the right in FIG. 6, the control unit 670 commands the first piezoelectrical stack 604 to expand from its neutral position over cable 622, simultaneously the control unit 670 opens the second flow control means 610—called active MEM-valve—in the sec-ond valve block 609 over the cable 619 and commands the second piezoelectrical stack 606 to contract from its neutral position over the cable 618 and the reservoir 189 to expand a step size over the cable 626 and to open the third (MEM-)valve 621 over the cable 625. The piston 602 moves to the right, lessens the second chamber 607 and hydraulic fluid flows from the second chamber 607 over the second pipes 614 and 615 through the open second flow control means 610 to the third chamber 613 and through the pipe 623 to the reservoir 189.

b) Second Step:

In the next step the control unit 670 closes the second control means 610 and the third valve 621.

c) Third Step:

Then the control unit 670 commands simultaneously the first piezoelectrical stack 604 to contract, the second piezoelectrical stack 606 to expand fully and the first flow control means 612—MEM-valve—in the first valve block 611 to open over the cables 618, 619 and 622. Hydraulic fluid flows now from the third chamber 613 to the first chamber 608 over the first pipes 617 and 616.

d) Fourth Step:

The control unit 670 closes the first flow control means 612.

Now it begins with the first step a) again, with the differences as already described above for the fifth embodiment.

In the following, an operation of the hydraulic actuator 600 for moving the piston 602 from the right to the left in FIG. 6—example for second actuation direction—is described.

At the start, all flow control means 610, 612 are closed and all the piezoelectrical stacks 604, 606 are in the neutral position.

e2) First Step:

To move the piston 602 from the right to the left the control unit 670 commands the first piezoelectrical stack 604 to contract from its neutral position over cable 622, simultaneously the control unit 670 opens the second flow control means 610—active MEM-valve—in the second valve block 609 over the cable 619 and commands the second piezoelectrical stack 606 to expand from its neutral position over cable 618 and the reservoir 189 to contract a step size and the third valve 621 to open. The piston 602 moves to the left, lessens the first chamber 608 and hydraulic fluid flows from the third chamber 613 over the second pipes 615 and 614 through the open second flow control means 610 to the second chamber 607. This also implies that the braking means is switched in the non-braking mode.

f2) Second Step:

In the next step the control unit 670 closes the second flow control means 610 and the third valve 621.

g2) Third Step:

Then the control unit 670 commands simultaneously the first piezoelectrical stack 604 to expand fully, the second piezoelectrical stack 606 to contract fully and the first flow control means 612—MEM-valve—in the first valve block 611 to open over the cables 622, 619, and 618. Hydraulic fluid flows now from the first chamber 608 to the third chamber 613 through the first pipes 617 and 616. This also implies that the braking means 14 is switched in the braking mode.

h2) Fourth Step:

The control unit 670 closes the first flow control means 612.

Now it begins with the first step e2) again. The difference in following first steps e2) is, that the first piezoelectrical stack 604 contracts not from its neutral position, but from its expanded position to its fully contracted position and that the second piezoelectrical stack 606 expands not from its neutral position, but from its fully contracted position to its fully contracted position. The step size of the reservoir 189 has to be doubled in the first step e2).

In the following, the seventh embodiment of the hydraulic actuator 700 and a preferred operation mode thereof is described in more detail with reference to FIG. 7.

In accordance with FIG. 7 the actuator 700 compromises the housing 701, the piston rod 703 and the piston 702, which divides the housing 701 and the hydraulic fluid in the first chamber 708 and the second chamber 707. Also, there is the third chamber 731, in difference to the first and second embodiments of FIGS. 1, 2, 5 and 6 not behind second chamber 707, but around the housing 701 as a hollow cylinder 730. The valve blocks 109 and 111 are not needed, because the first flow control means 740, 741 and the second flow control means 742, 743—here in the form of MEM-valves—can be integrated in the housing 701. The first and second fluid connections 10, 12 are in the form of fluid passages in a wall between the housing 701 and the hollow cylinder 730 that can be opened and closed by the flow control means 740-743.

In the following, an operation of the hydraulic actuator 700 for moving the piston 702 from the left to the right in FIG. 7—example for first actuation direction—is described.

At the start, all flow control means 740-743, 720 are closed and all the arrangements of piezoelectric elements 704, 732, 705—referred to as first to third piezoelectrical stacks 704, 732, 705 in the following—are in the neutral position.

a) First Step:

To move the piston 702 from the left to the right in FIG. 7 the control unit 770 commands the first piezoelectrical stack 704 to expand from its neutral position over cable 722, simultaneously the control unit 770 opens the second flow control means 742, 743—so-called active MEM-valves—in housing 701 over the cable 734 and 736 and commands the second piezoelectrical stack 732 to contract from its neutral position over the cable 733 and the third valve 720 to open and the reservoir 189 to expand a step size over cable 723. The piston 702 moves to the right, lessens the second chamber 707 and hydraulic fluid flows from the second chamber 707 through the open second flow control means 742 and 743 to the third chamber 731.

b) Second Step:

In the next step the control unit 770 closes the second flow control means 742 and 743 and the third valve 720.

c) Third Step:

Then the control unit 770 commands simultaneously the first piezoelectrical stack 704 to contract, the second piezoelectrical stack 732 to expand fully and the first flow control means 740 and 741—MEM-valves—in the housing 701 to open over the cables 733, 735 and 736 and 722.

Hydraulic fluid flows now from the third chamber 731 to the first chamber 708 over the first flow control means 741 and 740.

d) Fourth Step:

The control unit 770 closes the first flow control means 740 and 741.

Now it begins with the first step a) again. The difference in following first steps a) is, that the first piezoelectrical stack 704 expands not from its neutral position, but from its contracted position to its fully expanded position and that the second piezoelectrical stack 732 contracts not from its neutral position, but from its fully expanded position to its fully contracted position. The step size of the reservoir 189 has to be doubled for the first step a).

In the following, an operation of the hydraulic actuator 700 for moving the piston 702 from the right to the left in FIG. 7—example for second actuation direction—is described.

At the start, all flow control means 740-743, 720 are closed and all piezoelectrical stacks 704, 732, 705 are in the neutral position.

e1) First Step:

To move the piston 702 from the right to the left the control unit 770 commands the third piezoelectrical stack 705 to expand from its neutral position over cable 719, simultaneously the control unit 770 opens the first flow control means 740, 741—so-called active MEM-valves—in the housing 701 over the cables 761 and 762 and commands the second piezoelectrical stack 732 to contract from its neutral position over cable 733. The piston 702 moves to the left, lessens the first chamber 708 and hydraulic fluid flows from the first chamber 708 through the open first flow control means 740 and 741 to the third chamber 731.

f1) Second Step:

In the next step the control unit 770 closes the first flow control means 740 and 741.

g1) Third Step:

Then the control unit 770 commands simultaneously the third piezoelectrical stack 705 to contract, the second piezo-electrical stack 732 to expand fully and the second flow control means 742 and 743—MEM-valves—in the housing 701 to open over the cables 719, 733 and 763 and the valve 720 to open and the reservoir 189 to contract a step size. Hydraulic fluid flows now from the third chamber 731 to the second chamber 707.

h1) Fourth Step:

The control unit 770 closes the second flow control means 742 and 743 and the third valve 720.

Now it begins with the first step again e1). The difference in following first steps e1) is, that the third piezoelectrical stack 705 expands not from its neutral position, but from its contracted position to its fully expanded position and that the second piezoelectrical stack 732 contracts not from its neutral position, but from its fully expanded position to its fully contracted position. In the third step g1) the step size of the reservoir 189 has to be doubled.

In the following, the eighth embodiment of the hydraulic actuator 800 and a preferred operation mode thereof is described in more detail with reference to FIG. 8.

In accordance with FIG. 8 the actuator 800 compromises the housing 801, the piston rod 803 and the piston 802, configured as hollow piston 802, which divides the housing 801 and the hydraulic fluid in the first chamber 808 and the second chamber 807. Also, there is the third chamber 809, but here placed in the hollow piston 802, in difference to FIGS. 1 and 5.

The fluid connections 10, 12 are formed as passages between the hollow piston 802 and the first and second chambers 808, 807 wherein these passages can be closed by flow control means 861-863 formed as active MEM-valves integrated in the piston 802. The second arrangement of piezoelectric elements includes piezoelectrical stacks 850-853 in the hollow piston 802.

In the following, an operation of the hydraulic actuator 800 for moving the piston 802 from the left to the right in FIG. 8—example for first actuation direction—is described.

At the start, all flow control means 860-863, 821 are closed and all the arrangements of piezoelectric elements 804, 850-853, 805—referred to as first to third piezoelec-trical stacks 804, 850-853, 805 in the following—are in the neutral position.

a) First Step:

To move the hollow piston 802 from the left to the right the control unit 870 commands the first piezoelectrical stack 804 to expand from its neutral position over cable 820, simultaneously the control unit 870 opens the second flow control means 862, 863—called active MEM-valves—over not shown cables and commands the second piezoelectrical stacks 850, 851, 852 and/or 853 to contract from their neutral position over cable 834 and the reservoir 189 to expand a step size over the cable 819 and to open the third (MEM-)valve 821 over the cable 825. The piston 802 moves to the right, lessens the second chamber 807 and hydraulic fluid flows from the second chamber 807 through the open second flow control means 862 and 863 to the third chamber 809 and through the pipe 823 to the reservoir 189.

b) Second Step:

In the next step the control unit 870 closes the second flow control means 862 and 863 and the third valve 821.

c) Third Step:

Then the control unit 870 commands simultaneously the first piezoelectrical stack 804 to contract, the second piezo-electrical stacks 850, 851, 852 and/or 853 to expand fully and the first flow control means 860, 861—MEM-valves—in the piston 802 to open over cables 834, 830 and a not shown cable. Hydraulic fluid flows now from the third chamber 809 to the first chamber 808 over the first control means 860 and 861.

d) Fourth Step:

The control unit 870 closes the first flow control means 860 and 861.

Now it begins with the first step again a). The difference in following first steps a) is, that the first piezoelectrical stack 804 expands not from its neutral position, but from its contracted position to its fully expanded position and that the second piezoelectrical stacks 850, 851, 852 and 853 contract not from their neutral position, but from their fully expanded position to their fully contracted position. The step size of the reservoir 189 has to be doubled in the first step a).

In the following, an operation of the hydraulic actuator 800 for moving the piston 802 from the right to the left in FIG. 8—example for second actuation direction—is described.

At the start, all flow control means 860-863 are closed and all piezoelectrical stacks 804, 850-853, 805 are in the neutral position.

e1) First Step:

To move the piston 802 from the right to the left the control unit 870 commands the third piezoelectrical stack 805 to expand from its neutral position over cable 825, simultaneously the control unit 870 opens the first flow control means 860, 861—so-called active MEM-valves—in the piston 802 over a not shown cable and commands the second piezoelectrical stacks 850, 851, 852 and/or 853 to contract from their neutral position over the cable 834. The piston 802 moves to the left, lessens the first chamber 808 and hydraulic fluid flows from the first chamber 808 through the open first flow control means 860 and 861 to the third chamber 809.

f1) Second Step:

In the next step the control unit 870 closes the first flow control means 860 and 861.

g1) Third Step:

Then the control unit 870 commands simultaneously the third piezoelectrical stack 805 to contract, the second piezo-electrical stacks 850, 851, 852 and/or 853 to expand fully and the second flow control means 862 and 863—MEM-valves—in the piston 802 to open over the cables 834, 825 and a not shown cable and to contract the reservoir 189 a step size and to open valve 821 over the cable 824. Hydraulic fluid flows now from the third chamber 809 and the reservoir 189 to the second chamber 807.

h1) Fourth Step:

The control unit 870 closes the second flow control means 862 and 863.

Now it begins with the first step e1) again. The difference in following first steps a1) is, that the third piezoelectrical stack 805 expands not from its neutral position, but from its contracted position to its fully expanded position and that the piezoelectrical stacks 850, 851, 852 and/or 853 contract not from their neutral position, but from their fully expanded position to their fully contracted position. The step size of the reservoir 189 in the third step g1 has to be doubled.

In order to provide a less complex and more reliable actuator, especially for aircrafts, the invention provides a hydraulic actuator (100, 200, 300, 400, 500, 600, 700, 800) comprising a housing (101, 201, 301, 401, 501, 601, 701, 801), a piston (102, 202, 302, 402, 502, 602, 702, 802), first to third pressure chambers (107, 207, 307, 407, 507, 607, 707, 807; 108, 208, 308, 408, 508, 608, 708, 808; 113, 213, 331, 409, 513, 613, 731, 809), and a plurality of arrangements of piezoelectric elements (104, 105, 106; 204, 206; 304, 305; 404, 405, 450, 451; 504, 505, 506; 604, 606; 704, 705; 804; 805, 850, 851) arranged inside one of the plurality of chambers (107, 207, 307, 407, 507, 607, 707, 807; 108, 208, 308, 408, 508, 608, 708, 808; 113, 213, 331, 409, 513, 613, 731, 809). A computer implemented internal braking means (14) for selectively switching between a braking mode and a non-braking mode of the piston comprises the third chamber (113, 213, 331, 409, 513, 613, 731, 809), and fluid connections (10, 12) between the first to third chambers with flow control means (112, 212, 340, 341, 460, 461, 512, 612, 740, 741, 860, 861; 110; 210; 342, 343; 462, 463; 510; 610; 742, 743; 862, 863).

Further embodiments include all meaningful combinations of the components in FIGS. 1 to 8. In some embodiments the third chambers are divided in sub-chambers. In case of such a division there are a plurality of third chambers.

Embodiments of the hydraulic actuators can be used for the same purposes and with similar functionality as this is disclosed in EP 3 324 055 B1.

The systems and devices described herein may include a controller or a computing device comprising a processing and a memory which has stored therein computer-executable instructions for implementing the processes described herein. The processing unit may comprise any suitable devices configured to cause a series of steps to be performed so as to implement the method such that instructions, when executed by the computing device or other programmable apparatus, may cause the functions/acts/steps specified in the methods described herein to be executed. The processing unit may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory may be any suitable known or other machine-readable storage medium. The memory may comprise non-transitory computer readable storage medium such as, for example, but not limited to, an electronic, magnetic, optical, electromagnetic, infrared, or semiconductor system, apparatus, or device, or any suitable combination of the foregoing. The memory may include a suitable combination of any type of computer memory that is located either internally or externally to the device such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. The memory may comprise any storage means (e.g., devices) suitable for retrievably storing the computer-executable instructions executable by processing unit.

The methods and systems described herein may be implemented in a high-level procedural or object-oriented programming or scripting language, or a combination thereof, to communicate with or assist in the operation of the controller or computing device. Alternatively, the methods and systems described herein may be implemented in assembly or machine language. The language may be a compiled or interpreted language. Program code for implementing the methods and systems described herein may be stored on the storage media or the device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein.

Computer-executable instructions may be in many forms, including modules, executed by one or more computers or other devices. Generally, modules include routines, programs, objects, components, data structures, etc., that perform particular tasks or implement particular abstract data types. Typically, the functionality of the modules may be combined or distributed as desired in various embodiments.

It will be appreciated that the systems and devices and components thereof may utilize communication through any of various network protocols such as TCP/IP, Ethernet, FTP, HTTP and the like, and/or through various wireless communication technologies such as GSM, CDMA, Wi-Fi, and WiMAX, is and the various computing devices described herein may be configured to communicate using any of these network protocols or technologies.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A hydraulic actuator comprising:

a housing surrounding a cavity, a piston arranged on a piston rod, a plurality of pressure chambers, and a plurality of arrangements of piezoelectric elements, each of the arrangements arranged adjacent a chamber from the plurality of chambers and configured to selectively contract or expand in order to change a volume of the chamber bordered by the piezoelectric elements of the arrangement; and a braking means configured for a selectively switching between a braking mode and a non-braking mode, wherein in the braking mode the braking means brakes movement of the piston and in the non-braking mode the braking means does not brake movement of the piston, wherein the plurality of pressure chambers includes a first chamber and a second chamber separated by the piston that is movable along an actuation direction, wherein the plurality of arrangements of piezoelectric elements includes a first arrangement of piezoelectric elements arranged adjacent the first chamber and configured to change a volume of the first chamber occupied by the piezoelectric elements of the first arrangement, and wherein the plurality of arrangements of piezoelectric elements includes a second arrangement of piezoelectric elements, wherein the plurality of pressure chambers includes a third chamber, wherein the braking means comprises the third chamber, a first fluid connection with a first flow control means and a second fluid connection with a second flow control means;

wherein the first fluid connection connects the third chamber and the first chamber and the first flow control means is configured to selectively vary a flow of a hydraulic fluid through the first fluid connection, and wherein the second fluid connection connects the third chamber and the second chamber and the second flow control means is configured to selectively vary a flow of hydraulic fluid through the second fluid connection, wherein the second arrangement of piezoelectric elements is arranged adjacent the third chamber and is configured to change a volume of the third chamber.

2. The hydraulic actuator according to claim 1, wherein the plurality of arrangements of piezoelectric elements includes a third arrangement of piezoelectric elements arranged adjacent the second chamber and configured to change the volume of the second chamber.

3. The hydraulic actuator according to claim 1, wherein the third chamber is arranged at one of an axial end of the housing adjacent to one of the first and second chambers, or radially adjacent to the cavity, or around the cavity, or inside the piston.

4. The hydraulic actuator according to claim 1, wherein the first flow control means comprises a first valve block including a first valve and a first pipe connecting the first valve block with the second chamber and another first pipe connecting the first valve block with the third chamber, or wherein the first flow control means comprises a first passage in a first wall between the first and third chambers and the first passage contains or is formed by a valve, and wherein the second flow control means comprises a second valve block including a second valve and a second pipe connecting the second valve block with the first chamber and another second pipe connecting the second valve block with the third chamber, or wherein the second flow control means comprises a second passage in a second wall between the second and third chambers and the second passage contains or is formed by a valve.

5. The hydraulic actuator according to claim 1, wherein a hydraulic fluid reservoir connected to at least one chamber selected from a group consisting of: the first, second, and third chambers, such that hydraulic fluid flows from the hydraulic fluid reservoir to the at least one chamber or from the at least one chamber to the hydraulic fluid reservoir.

6. The hydraulic actuator according to claim 1 further comprising:

an electronic control unit configured to control the plurality of arrangements of piezoelectric elements and the first and second flow control means of the braking means to conduct a first operation with the following sequence of steps a) to d):

a) while the first flow control means is closed, opening the second flow control means, expanding the first arrangement of piezoelectric elements and contracting the second arrangement of piezoelectric elements so that the piston moves in a direction towards the second chamber, the volume of the second chamber is decreased and hydraulic fluid flows from the second chamber via the second fluid connection to the third chamber;

b) closing the second flow control means;

c) opening the first flow control means, contracting the first arrangement of piezoelectric elements, and expanding the second arrangement of piezoelectric elements so that hydraulic fluid flows from the third chamber via the first fluid connection to the first chamber and the movement of the piston is braked;

d) closing the first flow control means.

7. The hydraulic actuator according to claim 6, wherein the electronic control unit is configured to control the plurality of arrangements of piezoelectric elements and the first and second flow control means of the braking means such that the first operation is repeated one or several times in order to move the piston in a first actuating direction.

8. The hydraulic actuator according to claim 6, wherein the plurality of arrangements of piezoelectric elements includes a third arrangement of piezoelectric elements arranged adjacent the second chamber and configured to change the volume of the second chamber, and wherein the electronic control unit is configured to further control the plurality of arrangements of piezoelectric elements and the first and second flow control means of the braking means to conduct a second operation with the following sequence of steps:

e1) while the second flow control means is closed, opening the first flow control means, expanding the third arrangement of piezoelectric elements and contracting the second arrangement of piezoelectric elements so that the piston moves in a direction towards the first chamber, the volume of the first chamber is decreased and hydraulic fluid flows from the first chamber via the first fluid connection to the third chamber;

f1) closing the first flow control means;

g1) opening the second flow control means, contracting the third arrangement of piezoelectric elements, and expanding the second arrangement of piezoelectric elements so that hydraulic fluid flows from the third chamber via the first fluid connection to the first chamber while movement of the piston is braked;

h1) closing the second flow control means.

9. The hydraulic actuator according to claim 6, wherein the electronic control unit is configured to further control the plurality of arrangements of piezoelectric elements and the first and second flow control means of the braking means to conduct a second operation with the following sequence of steps:

e2) while the first flow control means is closed, opening the second flow control means, contracting the first arrangement of piezoelectric elements and expanding the second arrangement of piezoelectric elements so that the piston moves in a direction towards the first chamber, the volume of the first chamber is decreased and hydraulic fluid flows from the third chamber via the second fluid connection to the second chamber;

f2) closing the second flow control means;

g2) opening the first flow control means, expanding the first arrangement of piezoelectric elements, and contracting the second arrangement of piezoelectric elements so that hydraulic fluid flows from the first chamber via the first fluid connection to the third chamber and the movement of the piston is braked;

h2) closing the first flow control means.

10. The hydraulic actuator according to claim 9, wherein the electronic control unit is configured to control the plurality of arrangements of piezoelectric elements and the first and second flow control means of the braking means such that the second operation is repeated one or several times in order to move the piston in a second actuating direction.

11. The hydraulic actuator according to claim 1, wherein the first, second, and third chambers and the first and second fluid connection form a closed volume.

12. A method for operating a hydraulic actuator comprising a housing surrounding a cavity, a piston arranged on a piston rod, a plurality of pressure chambers, and a plurality of arrangements of piezoelectric elements, each of the arrangements arranged adjacent a chamber from the plurality of chambers and configured to selectively contract or expand in order to change a volume of said chamber, and a braking means configured for a selectively switching between a braking mode and a non-braking mode, wherein in the braking mode the braking means brakes movement of the piston and in the non-braking mode does not brake movement of the piston, wherein the plurality of pressure chambers includes a first chamber and a second chamber separated by the piston that is movable along an actuation direction, wherein the plurality of arrangements of piezoelectric elements includes a first arrangement of piezoelectric elements arranged adjacent the first chamber and configured to change the volume of the first chamber, and wherein the plurality of arrangements of piezoelectric elements includes a second arrangement of piezoelectric elements, wherein the braking means comprises a third chamber, a first fluid connection with a first flow control means and a second fluid connection with a second flow control means, wherein the first fluid connection connects the third chamber and the first chamber and the first flow control means is configured to selectively vary a flow of a hydraulic fluid through the first fluid connection, and wherein the second fluid connection connects the third chamber and the second chamber and the second flow control means is configured to selectively vary the flow of hydraulic fluid through the second fluid connection, wherein the second arrangement of piezoelectric elements s arranged adjacent the third chamber and is configured to change the volume of the third chamber occu, the method comprising the following sequence of steps:

a) while the first flow control means is closed, opening the second flow control means, expanding the first arrangement of piezoelectric elements and contracting the second arrangement of piezoelectric elements so that the piston moves in a direction towards the second chamber, the volume of the second chamber is decreased and hydraulic fluid flows from the second chamber via the second fluid connection to the third chamber;

b) closing the second flow control means;

c) opening the first flow control means, contracting the first arrangement of piezoelectric elements, and expanding the second arrangement of piezoelectric elements so that hydraulic fluid flows from the third chamber via the first fluid connection to the first chamber and the movement of the piston is braked;

d) closing the first flow control means.

13. The method according to claim 12, wherein the plurality of arrangements of piezoelectric elements includes a third arrangement of piezoelectric elements arranged adjacent the second chamber and configured to change the volume of the second chamber occupied by the piezoelectric elements of the third arrangement, and the method further comprising the following sequence of steps:

e1) while the second flow control means is closed, opening the first flow control means, expanding the third arrangement of piezoelectric elements and contracting the second arrangement of piezoelectric elements so that the piston moves in a direction towards the first chamber, the volume of the first chamber is decreased and hydraulic fluid flows from the first chamber via the first fluid connection to the third chamber;

f1) closing the first flow control means;

g1) opening the second flow control means, contracting the third arrangement of piezoelectric elements, and expanding the second arrangement of piezoelectric elements so that hydraulic fluid flows from the third chamber via the first fluid connection to the first chamber while movement of the piston is braked;

h1) closing the second flow control means.

14. The method according to claim 12 further comprising:

repeating the steps e1) to h1) one or several times for moving the piston in a second actuation direction.

15. The method according to claim 12, further comprising the following sequence of steps:

e2) while the first flow control means is closed, opening the second flow control means, contracting the first arrangement of piezoelectric elements and expanding the second arrangement of piezoelectric elements so that the piston moves in a direction towards the first chamber, the volume of the first chamber is decreased and hydraulic fluid flows from the third chamber via the second fluid connection to the second chamber;

f2) closing the second flow control means;

g2) opening the first flow control means, expanding the first arrangement of piezoelectric elements, and contracting the second arrangement of piezoelectric elements so that hydraulic fluid flows from the first chamber via the first fluid connection to the third chamber and the movement of the piston is braked;

h2) closing the first flow control means.

16. The method according to claim 12 further comprising:

repeating steps e2) to h2) one or several times for moving the piston in a second actuation direction.

17. The method according to claim 12 further comprising:
repeating steps a) to d) one or several times for moving
  the piston in a first actuation direction.

\* \* \* \* \*